United States Patent
Shen et al.

(10) Patent No.: US 8,509,829 B2
(45) Date of Patent: Aug. 13, 2013

(54) METHOD, SYSTEM AND EQUIPMENT FOR IMPLEMENTING USSD SERVICE IN CDMA NETWORK

(75) Inventors: Song Shen, Shenzhen (CN); Dan Hu, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 0 days.

(21) Appl. No.: 13/505,121

(22) PCT Filed: Mar. 24, 2010

(86) PCT No.: PCT/CN2010/071280
§ 371 (c)(1),
(2), (4) Date: Apr. 30, 2012

(87) PCT Pub. No.: WO2010/148682
PCT Pub. Date: Dec. 29, 2010

(65) Prior Publication Data
US 2012/0264462 A1 Oct. 18, 2012

(30) Foreign Application Priority Data
Nov. 10, 2009 (CN) .......................... 2009 1 0211443

(51) Int. Cl.
*H04W 4/00* (2009.01)
(52) U.S. Cl.
USPC ........ 455/466; 455/566; 455/410; 455/414.1; 370/328; 370/260; 370/352
(58) Field of Classification Search
USPC .............. 455/566, 410, 414.1; 370/328, 260, 370/252
See application file for complete search history.

(56) References Cited

U.S. PATENT DOCUMENTS

| | | | |
|---|---|---|---|
| 7,031,699 B1* | 4/2006 | Andersen | 455/419 |
| 8,311,518 B2* | 11/2012 | Fiorini et al. | 455/414.1 |
| 2003/0211845 A1* | 11/2003 | Lohtia et al. | 455/414.3 |
| 2006/0135213 A1* | 6/2006 | Jiang | 455/566 |
| 2007/0211873 A1* | 9/2007 | Wang | 379/142.01 |
| 2008/0070601 A1 | 3/2008 | Brueckheimer et al. | |

(Continued)

FOREIGN PATENT DOCUMENTS

| | | |
|---|---|---|
| CN | 101111071 A | 1/2008 |
| CN | 101247555 A | 8/2008 |
| CN | 101437089 A | 5/2009 |

OTHER PUBLICATIONS

International Search Report dated Aug. 19, 2010 for PCT/CN2010/071280.

*Primary Examiner* — Charles Shedrick
(74) *Attorney, Agent, or Firm* — Banner & Witcoff, Ltd.

(57) ABSTRACT

The present invention provides a method for implementing an Unstructured Supplementary Service Data (USSD) service in a Code Division Multiple Access (CDMA) network, which is implemented based on a mobile intelligent network service and a flash message service. A Mobile Switching Center (MSC) triggers the mobile intelligent network service, a Service Control Point (SCP) determines an operation type code of the current step according to a user identification and a USSD access code and performs a corresponding operation, and at the same time constructs short message content associated with the operation type code of the current step, and transmits the short message content to a Mobile Station (MS) by way of the flash message. The present invention also correspondingly provides a system and device for implementing a USSD service in a CDMA network. By providing an operation prompt, the present invention realizes real-time message interaction, and reduces user's misoperation effectively.

20 Claims, 7 Drawing Sheets

(56) References Cited

U.S. PATENT DOCUMENTS

| | | |
|---|---|---|
| 2008/0108333 A1* | 5/2008 | Jemison et al. ............ 455/414.1 |
| 2008/0117893 A1* | 5/2008 | Witzel et al. ................. 370/352 |
| 2008/0316944 A1* | 12/2008 | Nachum ....................... 370/260 |
| 2009/0227229 A1* | 9/2009 | Waller ......................... 455/406 |
| 2010/0317381 A1* | 12/2010 | van Meurs .................... 455/466 |
| 2012/0243472 A1* | 9/2012 | Bienn et al. .................. 370/328 |

* cited by examiner

US 8,509,829 B2

METHOD, SYSTEM AND EQUIPMENT FOR IMPLEMENTING USSD SERVICE IN CDMA NETWORK

TECHNICAL FIELD

The present invention relates to the field of mobile communication, and in particular, to a method, system and device for implementing an Unstructured Supplementary Service Data (USSD) service in a Code Division Multiple Access (CDMA) network.

BACKGROUND OF THE RELATED ART

The USSD service is a new interactive data service based on a Global System for Mobile Communication (GSM) network. A user can enter a service access code custom-made by a network in advance through a Mobile Station (MS) keypad, for example, "108#", and then press a "transmitting key" so that an instruction can be transmitted to the network. The network returns to a main menu according to the instruction transmitted by the user, the user can select an next operation according to a prompt of the main menu, and the network returns to the next level of menu or content according to the selection of the user, thereby providing the USSD service needed by the user.

In the GSM network, both the USSD service and a Short Message Service (SMS) transmit data through a signaling channel of the network. The USSD service uses a Stand-alone Dedicated Control Channel (SDCCH) in a session state, and uses a Fast Associated Control Channel (FACCH) in a non-session state. The difference between the USSD service and the SMS is in that the SMS adopts a store and forward mode and the USSD service adopts a session-oriented mode, and the USSD service has characteristics such as a fast response speed, strong interaction capacity, high reliability, etc., and is suitable for providing services of payment type and transaction type for users, for example, account query, recharge, transfer accounts, report the loss, etc.

In the CDMA network, due to the limitation of the existing CDMA network protocol, the USSD service cannot be implemented, thereby it is impossible to provide users with the USSD services such as account query, recharge, etc. In the existing CDMA network, some mobile intelligent network services, such as Pre-Paid Charging (PPC) service, implements some USSD functions through a short number access management mode of USSD like; however, real-time message interaction cannot be performed between the user and the network, and thus, there is a large limitation, and portability and scalability are poor.

SUMMARY OF THE INVENTION

The present invention provides a method, system and device for implementing a USSD service in a CDMA network, so as to solve a problem that a USSD service based on real-time message interaction cannot be implemented in the existing CDMA network.

A method for implementing an Unstructured Supplementary Service Data (USSD) service in a Code Division Multiple Access (CDMA) network provided by the present invention comprises:

a Mobile Switching Center (MSC) transmitting an origination request (ORREQ) message carrying a user identification and a USSD access code to a Service Control Point (SCP) according to a queried mobile intelligent subscription information of a Mobile Station (MS) when receiving a call request carrying the USSD access code transmitted by the MS;

the SCP starting up a USSD service operation process according to the USSD access code carried in the received ORREQ message, determining an operation type code of a current step according to the user identification and the USSD access code, and performing a corresponding operation according to the operation type code of the current step;

the SCP constructing short message content associated With the operation type code of the current step, and transmitting the constructed short message content and a short message type identification to a Short Message Service Center (SMSC); and the SMSC transmitting the short message content to the MS by way of a flash message indicated by the short message type identification.

A system for implementing an Unstructured Supplementary Service Data (USSD) service in a Code Division Multiple Access (CDMA) network provided by the present invention, comprises: a Mobile Switching Center (MSC), a Service Control Point (SCP) and a Short Message Service Center (SMSC); wherein, the MSC is configured to transmit an origination request (ORREQ) message carrying a user identification and a USSD access code to the SCP according to a queried mobile intelligent subscription information of a Mobile Station (MS) when receiving a call request carrying the USSD access code transmitted by the MS;

the SCP is configured to start up a USSD service operation process according to the USSD access code carried in the received ORREQ message, determine an operation type code of a current step according to the user identification and the USSD access code, and perform a corresponding operation according to the operation type code of the current step; and construct short message content associated with the operation type code of the current step, and transmit the constructed short message content and a short message type identification to the SMSC; and the SMSC is configured to transmit the short message content to the MS by way of a flash message indicated by the short message type identification.

A Service Control Point (SCP) device provided by the present invention comprises:

a startup unit, configured to receive an origination request (ORREQ) message carrying a user identification and a USSD access code transmitted by a Mobile Switching Center (MSC), and start up a USSD service operation process according to the USSD access code carried in the received ORREQ message;

a determination unit, configured to determine an operation type code of a current step according to the user identification and the USSD access code;

a processing unit, configured to perform a corresponding operation according to the operation type code of the current step; and a transmitting unit, configured to construct short message content associated with the operation type code of the current step, transmit the constructed short message content and a short message type identification to the SMSC, wherein the short message type identification indicates transmitting the short message content by way of a flash message.

The method for implementing a USSD service in a CDMA network provided by the present invention is implemented based on a mobile intelligent network service and a flash message service. The MSC triggers the mobile intelligent network service, the SCP determines the operation type code of the current step according to the user identification and the USSD access code and performs the corresponding operation, and meanwhile constructs the short message content associated with the operation type code of the current step, and transmits the short message content to the MS by way of the flash message, so as to provide an operation prompt, thus implementing real-time message interaction and reducing user's misoperation effectively.

PREFERRED EMBODIMENTS OF THE PRESENT INVENTION

The embodiments of the present invention provide the corresponding solution regarding to the problem that a USSD service based on real-time message interaction cannot be implemented in the existing CDMA network. In order to perform real-time message interaction between a user and a network, it is implemented based on a mobile intelligent network service and a flash message service.

In the GSM network, the flash short message (flash message for short) service is supported. The flash message is a particular short message. After receiving the flash message, the MS needs not to perform a traditional menu operation of reading a short message, and the short message content is displayed on the screen of the MS directly, and meanwhile the flash message cannot be stored. In the existing CDMA network, the flash message service is not supported. The embodiments of the present invention enable the CDMA network to support the flash message service by extending the CDMA network protocol.

Figure 1:
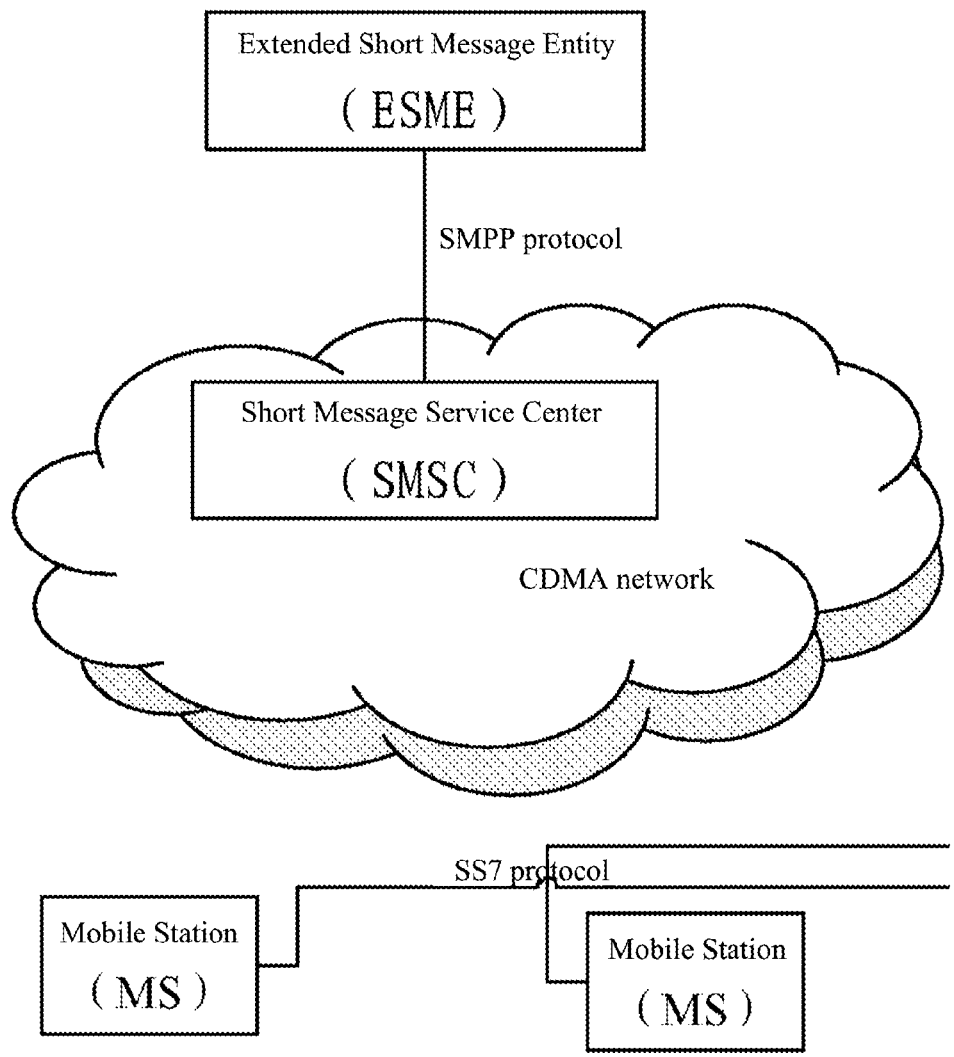
FIG. 1 is a networking diagram of a short message service system according to an embodiment of the present invention.

In the specific implementation, it is needed to reform the Short Message Service Center (SMSC) of the CDMA network, and meanwhile, the support by the MS is also needed. FIG. 1 is a networking diagram of a short message service system according to an embodiment of the present invention. As shown in FIG. 1, the reformed short message service system in the CDMA network comprises an Extended Short Message Entity (ESME) and the SMSC. The EMSE, as a Short Message Peer to Peer Protocol (SMPP) client, is connected with the SMSC, and a SMPP protocol is adopted between the ESME and the SMSC. The MS and the CDMA network are based on a Signaling System 7 (SS7) therebetween.

On basis of implementing the flash message service in the CDMA network, an embodiment of the present invention provides a method for implementing the USSD service in the CDMA network, which is implemented based on the mobile intelligent network service and the flash message service. The user performs the real-time message interaction with the network by transmitting a USSD access code and receiving the flash message, so as to provide the USSD service needed by the user.

The Mobile Intelligent Network (MIN) introduces related functional entities of an intelligent network in the mobile communication network, thereby separating the service control function from the mobile switching function, which enables the network to create and implement various mobile intelligent network services quickly and efficiently. The intelligent network protocol corresponding to the CDMA network is a Wireless Intelligent Network (WIN) protocol. In the typical intelligent network architecture, an intelligent service is created by a Service Create Environment (SCE), and is submitted to a Service Control Point (SCP) by a Service Manage Point (SMP) after being verified, so as to be executed. One implementation process of the intelligent service is completed cooperatively by the SCP and a Service Switching Point (SSP).

If a user needs to use the mobile intelligent network service, the user firstly needs to subscribe the service, and becomes a subscriber of the mobile intelligent network service. After the user subscribes the mobile intelligent network service, the network side adds relevant information of the mobile intelligent network service in user information stored in a Home Location Register (HLR) thereof, which is referred to as mobile intelligent subscription information. With the mobile intelligent subscription information, the mobile intelligent network service can be triggered.

In the CDMA network, the embodiment of the present invention enables the SCP to provide various USSD functions of the USSD service by reforming the SCP to which the mobile intelligent network service belongs and using the existing mobile intelligent network. In the specific implementation, it can be implemented by reforming the SCP in software, or can also be implemented by reforming the SCP in hardware, or can also be implemented by reforming the SCP in both software and hardware.

The flow of implementing the USSD service in the CDMA network will be simply introduced hereinafter.

A user enters a main menu access code (or a first-level access code) and transmits to the network side through the MS. A Mobile Switching Center (MSC) knows that the user is a subscriber of the mobile intelligent network by querying user information (including mobile intelligent subscription information) stored in the HLR, and thus triggers the mobile intelligent network service belonging to the SCP, i.e., transmits an origination request (ORREQ) message to the SCP. After receiving the ORREQ message issued by the MSC, the SCP determines that which is requested by the user is the USSD service according to the service access code, and then starts up a USSD service operation process, performs a corresponding operation according to an operation type code of the current step, then constructs short message content and transmits to the SMSC, and meanwhile indicates the SMSC to transmit the short message content by way of a flash message. The SMSC transmits the short message content to the MS of the user by way of the flash message.

The user continues to enter a next-level menu access code (or a second-level access code) according to a prompt of the flash message returned by the SMSC, or may input operating parameters according to the prompt and transmit to the network side through the MS; and the MSC triggers the mobile intelligent network service again according to the queried mobile intelligent subscription information, and repeats the above-mentioned operations. With the real-time message interaction, the USSD functions needed by the user are finally completed.

In the embodiment of the present invention, the main menu access code is referred to as a service access code, the subsequent level menu access codes are collectively referred to as an operation access code, and both the service access code and the operation access code can be referred to as a USSD access code. In order to facilitate the description, a complete operation process from the MS transmitting the USSD access code to the SMSC returning the flash message is regarded as one step operation, and is referred to as one service example. Various USSD functions of the USSD service can be linearly comprised of one or more service examples.

Figure 2:
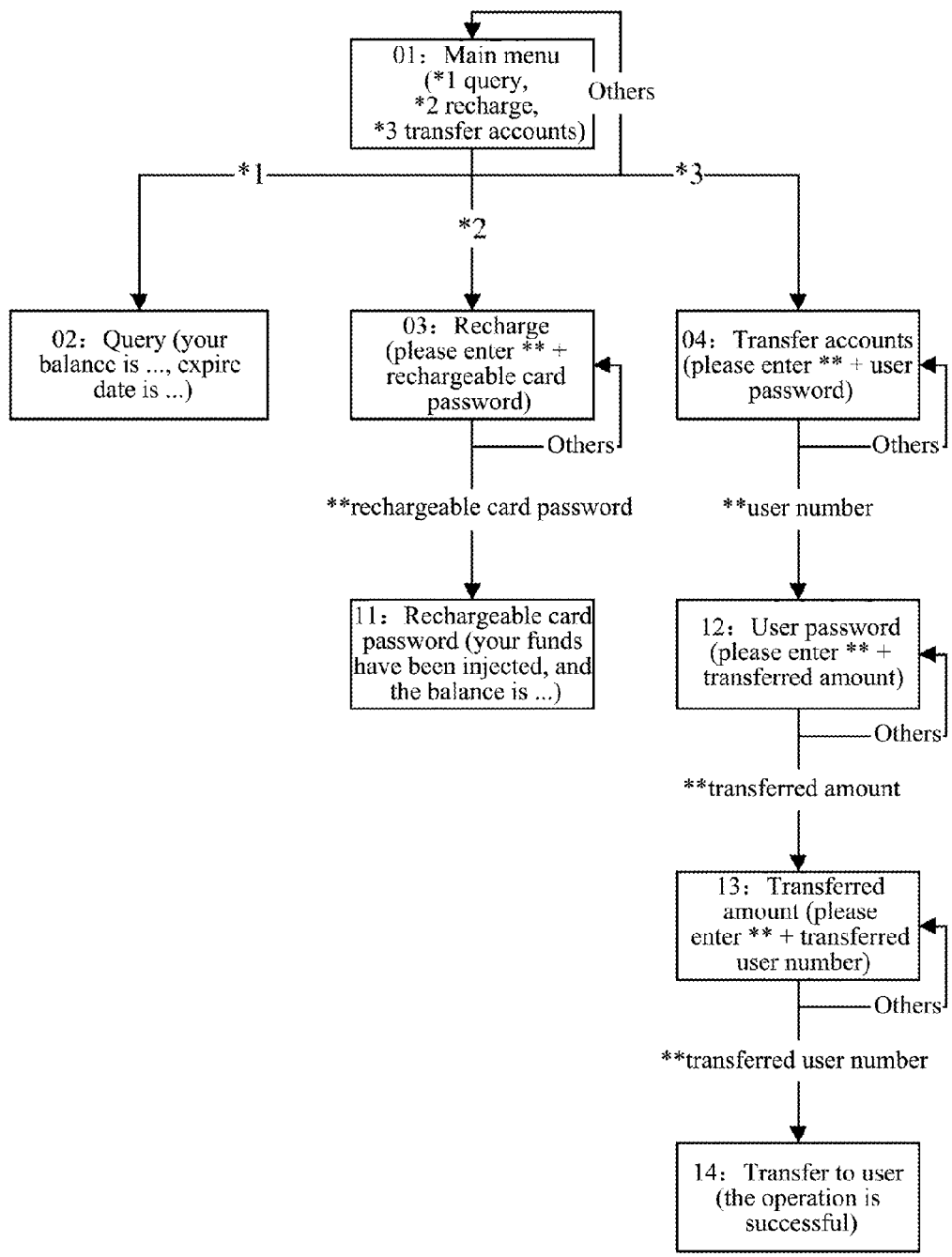
FIG. 2 is a structure diagram of a service management function tree according to an embodiment of the present invention.

On basis of introducing the service examples, an embodiment of the present invention provides a service management function tree. Each node of the service management function tree corresponds to a service example, and various nodes of the service management function tree comprise three types of nodes, i.e., root node, leaf node and a non-leaf node. FIG. 2 is a structure diagram of a service management function tree according to an embodiment of the present invention. As shown in FIG. 2, the USSD services in the embodiment comprise three USSD functions, i.e., account query, recharge, and transferring accounts; wherein, 1) the root node can be the main menu, for example, node 01, the root node is an overall access node of the whole service management function tree, and is also a starting point of all the USSD functions; and in view of the particularity thereof, the relevant parameters configured to that node cannot be modified randomly;

2) the non-leaf node can be the classification menus or intermediate processes, for example, nodes 03, 04, 12, 13, the primary functions of the non-leaf nodes are to lead the user each step of operation needed by performing the USSD function(s) through the prompt of the flash message, and meanwhile record the operating parameters needed by performing the USSD functions;

3) the leaf nodes can be the USSD functions, for example, nodes 02, 11, 14, after the user inputs all operating parameters needed by the USSD function operation of the last step, the SCP can directly invokes the corresponding functional module to process through an internal interface; and logics and processing modes of various USSD functions belong to the mature technology, thus the internal implementation of the functional module will no longer be described.

It should be illustrated that, if the implementation of a service example of any node fails, the service management function tree will maintain at that node, until the user re-transmits a service access code.

It can be seen that, all of various USSD functions of the USSD service based on the flash message service and the mobile intelligent network service are linearly composed of several service examples with the identical process.

Figure 3:
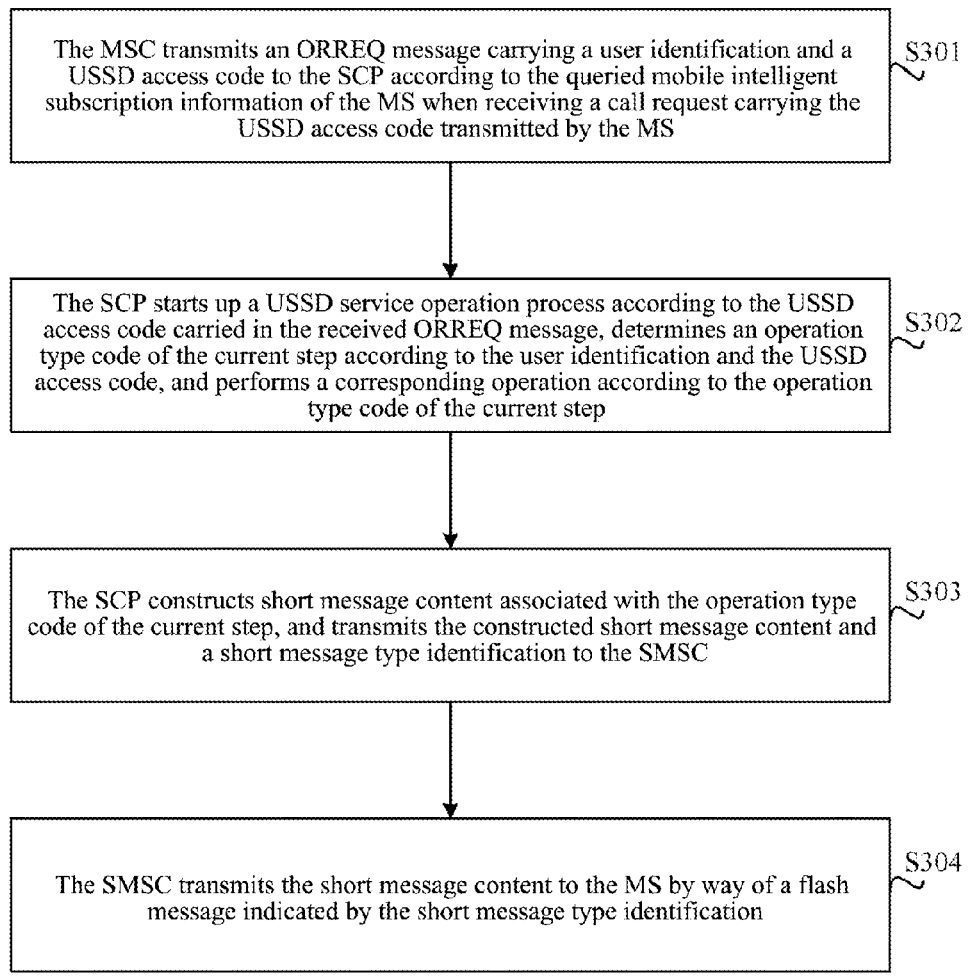
FIG. 3 is a flow chart of a method for implementing a USSD service in a CDMA network according to an embodiment of the present invention.

FIG. 3 is a flow chart of a method for implementing a USSD service in a CDMA network according to an embodiment of the present invention. As shown in FIG. 3, the method for implementing the USSD service in the CDMA network according to the embodiment of the present invention comprises the following steps.

In step S301, a MSC transmits an ORREQ message carrying a user identification and a USSD access code to a SCP according to a queried mobile intelligent subscription information of a MS when receiving a call request carrying the USSD access code transmitted by the MS.

Here, the USSD access code comprises a service access code and an operation access code. If the call request carries the service access code, the first step of operation of the USSD functions is implemented, and if the call request carries the operation access code, one step of operation in the subsequent various steps of operations of the USSD functions is implemented; and the operation access code transmitted by the MS is entered by the user according to the indication of the flash message returned by the SMSC in the previous step.

In step S302, the SCP starts up a USSD service operation process according to the USSD access code carried in the received ORREQ message, determines an operation type code of the current step according to the user identification and the USSD access code, and performs a corresponding operation according to the operation type code of the current step.

Alternatively, before the SCP determines the operation type code of the current step according to the user identification and the USSD access code, the method further comprises a step of the SCP performing an authentication on the MS according to the user identification, and only if the authentication is successful, continuing to perform the subsequent process, and if the authentication fails, ending the process.

In step S303, the SCP constructs short message content associated with the operation type code of the current step, and transmits the constructed short message content and a short message type identification to the SMSC.

In step S304, the SMSC transmits the short message contents to the MS by way of a flash message indicated by the short message type identification.

Then, the user can enter the USSD access code of the next step of operation according to the indication of the flash message returned by the SMSC and transmit to the network side through the MS, and the above operational process is repeated, until the USSD functions are implemented.

In the specific implementation, the embodiment of the present invention introduces a user state information table and a USSD service operation index table.

The user state information table records user identifications of various serving MSs and corresponding USSD state information thereof, and the USSD state information at least comprises an operation type code of the previous step; and preferably, the USSD state information can further comprise operating parameters of various preceding steps, operation time of the previous step, etc., as shown in Table. 1:

TABLE 1

| User identification | Operation type code of the previous step | Operation time of the previous step | Parameter one | Parameter two | Parameter three | ... | Parameter N |
|---|---|---|---|---|---|---|---|
| 8613306370004 | 01 | 20090601 2:00:05 | | | | | |

TABLE 1-continued

| User identification | Operation type code of the previous step | Operation time of the previous step | Parameter one | Parameter two | Parameter three | ... | Parameter N |
|---|---|---|---|---|---|---|---|
| 8613306370007 | 13 | 20090608 15:26:33 | 12345678 | 500 | | | |
| ... | | | | | | | |

The USSD service operation index table configures the USSD access code and the operation type code of the previous step to which each operation type code corresponds; preferably, the USSD service operation index table can further configure a first indication information to which each operation type code corresponds, wherein, the first indication information is configured to indicate whether the operation step to which the operation type code corresponds is a function complete operation; the USSD service, operation index table can farther configure a second indication information to which each operation type code corresponds, wherein, the second indication information is configured to indicate whether the various preceding steps receive the operating parameters; and the USSD service operation index table can further configure a short message content code to which each operation type code corresponds, etc., as shown in Table. 2:

content code, and the corresponding short message content is configured in a short message content configuration table.

On basis of introducing the user state information table and the USSD service operation index table, in the specific implementation, the determining the operation type code of the current step according to the user identification and the USSD access code comprises the following steps:

the user state information table is queried according to the user identification, and the USSD state information of the MS is obtained, wherein, the USSD state information at least comprises the operation type code of the previous step;

the preset USSD service operation index table is queried according to the obtained operation type code of the previous step and the USSD access code, and the operation type code of the current step is determined.

TABLE 2

| Operation type code | Operation type | USSD access code | Operation type code of the previous step | Second indication information | First indication information | Short message content code |
|---|---|---|---|---|---|---|
| 01 | Main menu | *1331088 | 00 | 0 | 0 | If querying, please transmit *1, if recharging, please transmit *2, and if transferring accounts, please transmit *3 |
| 02 | query | *1 | 01 | 0 | 1 | Your balance is . . . , and expire date is . . . |
| 03 | recharge | *2 | 01 | 0 | 0 | Please enter ** + rechargeable card password |
| 04 | Transfer accounts | *3 | 01 | 0 | 0 | Please enter ** + user password |
| 11 | rechargeable card password | ** | 03 | 1 | 1 | Your funds are injected, and the balance is . . . |
| 12 | User password | ** | 04 | 1 | 0 | Please enter ** + transferred amount |
| 13 | Transferred amount | ** | 12 | 1 | 0 | Please enter ** + transferring user identification |
| 14 | Transferred user | ** | 13 | 1 | 1 | The operation is successful |

It should be illustrated that table 2 presents specific content of the short message content in order to be convenient for understanding, and in practice, it should be a short message If the USSD service operation index table further configures the first indication information and the second indication information to which each operation type code corresponds, in the specific implementation, the performing the corresponding operation according to the operation type code of the current step comprises the following steps:

the SCP judges whether the current step is a function complete operation (a leaf node) according to the first indication information to which the operation type code of the current step corresponds, and if the current step is the function completion operation, the SCP performs the corresponding USSD function operation and deletes the user identification and the corresponding USSD state information thereof from the user state information table, and when performing the corresponding USSD function operation, the SCP further needs to extract the operating parameters of various preceding steps from the USSD state information to which the user identification corresponds and to use if determining the various preceding steps receive the operating parameters according to the second indication information to which the operation type code of the current step corresponds; and if the current step is not the function complete operation, the SCP updates the USSD state information to which the user identification corresponds in the user state information table, for example, the operation type code of the previous step in the USSD state information is updated as the determined operation type code of the current step.

Meanwhile, if the ORREQ message transmitted by the MSC further carries the operating parameter of the current step, the SCP needs to use the operating parameter of the current step carried in the ORREQ message when determining that the current step is the function complete operation and performing the corresponding USSD function operation; and when determining that the current step is not the function complete operation and updating the USSD state information to which the user identification corresponds in the user state information table, the SCP needs to update the operation type code of the previous step in the USSD state information as the determined operation type code of the current step and add in the USSD state information the operating parameter of the current step carried in the ORREQ message. Preferably, the SCP can perform a validation on legality of the operating parameter of the current step, and if a format or value of the operating parameter of the current step which is input by the user is wrong, a flash message with a fault prompt can be transmitted to the user, and the user will re-input after receiving the error prompt.

In the specific implementation, if the USSD access code carried in the ORREQ message is a service access code, whether the user state information table comprises the USSD state information to which the user identification corresponds will be judged before the user state information table is queried according to the user identification, and when the judgment result is yes, the USSD state information to which the user identification corresponds is cleared. After the user dials the service access code, the SCP clears the USSD state information of the user, which can avoid data interference in the last process of implementing the USSD functions.

In consideration of the user possibly terminating the operation in any intermediate operation in the process of implementing the USSD function, the SCP cannot determine the user's intention. Therefore, except for adding the function of clearing/deleting USSD state information in the main menu service example and the function completion service example, the USSD state information further needs to be cleared periodically. On one hand, the data amount in the user state information table can be reduced; and on the other hand, the possibility of the remaining of garbage data resulting in the user's misoperation can also be reduced. The time for periodic clearing can be synthesizouly configured according to factors such as the number of users and the number of services, which is referred to as state information clear time. In the specific implementation, when the preset state information clear time arrives, the USSD state information, in which a time interval between the operation time of the previous step and the state information clear time is larger than a preset time interval threshold, and the corresponding user identification thereof are deleted from the user state information table.

Alternatively, the SCP can charge the completed USSD function after determining that the current step is the function complete operation and performing the corresponding USSD function operation. If a USSD function is free or there is no need to perform charging by the SCP, there is no needed to perform that step.

In the specific implementation, the USSD service can configure the short message content configuration table in order to construct the short message content, and therefore, the construction of the short message content can be implemented only by adding a short message content code field in the USSD service operation index table, as an interface with the short message content configuration table. If the short message content configuration table is not configured in the USSD service, the interface of the short message content code field can still be maintained, and data tables are constructed or files are configured for being invoked by the functional module.

If the USSD service operation index table further configures a short message content code and a short message content configuration table to which each operation type code corresponds, the SCP constructing the short message content associated with the operation type code of the current step comprises the following steps:

the short message content code to which the operation type code of the current step corresponds is determined according to the USSD service operation index table;

the short message content is constructed according to the determined short message content code and the preset short message content configuration table, wherein, the short message content configuration table configures the short message content configuration information to which each short message content code corresponds, and the short message content configuration table is shown in FIG. 3. In all segment recordings to which the short message content codes correspond, the fixed content (content type), variable portion (amount type, for example, the user identification, amount, etc.), and separators are assembled in turn.

TABLE 3

| Short message content code | Number of segments | Segment number | separator | Content type | content |
|---|---|---|---|---|---|
| 1 | 4 | 1 |   | content | Your account is |
| 1 | 4 | 2 | , | amount |   |
| 1 | 4 | 3 |   | content | Expire date is |
| 1 | 4 | 4 | . | amount |   |
| 2 | 2 | 1 |   | content | Transfer success to receiver |
| 2 | 2 | 2 | . | amount |   |
| 3 | 1 | 1 | . | content | Recharge fail, please retry |

Figure 4:
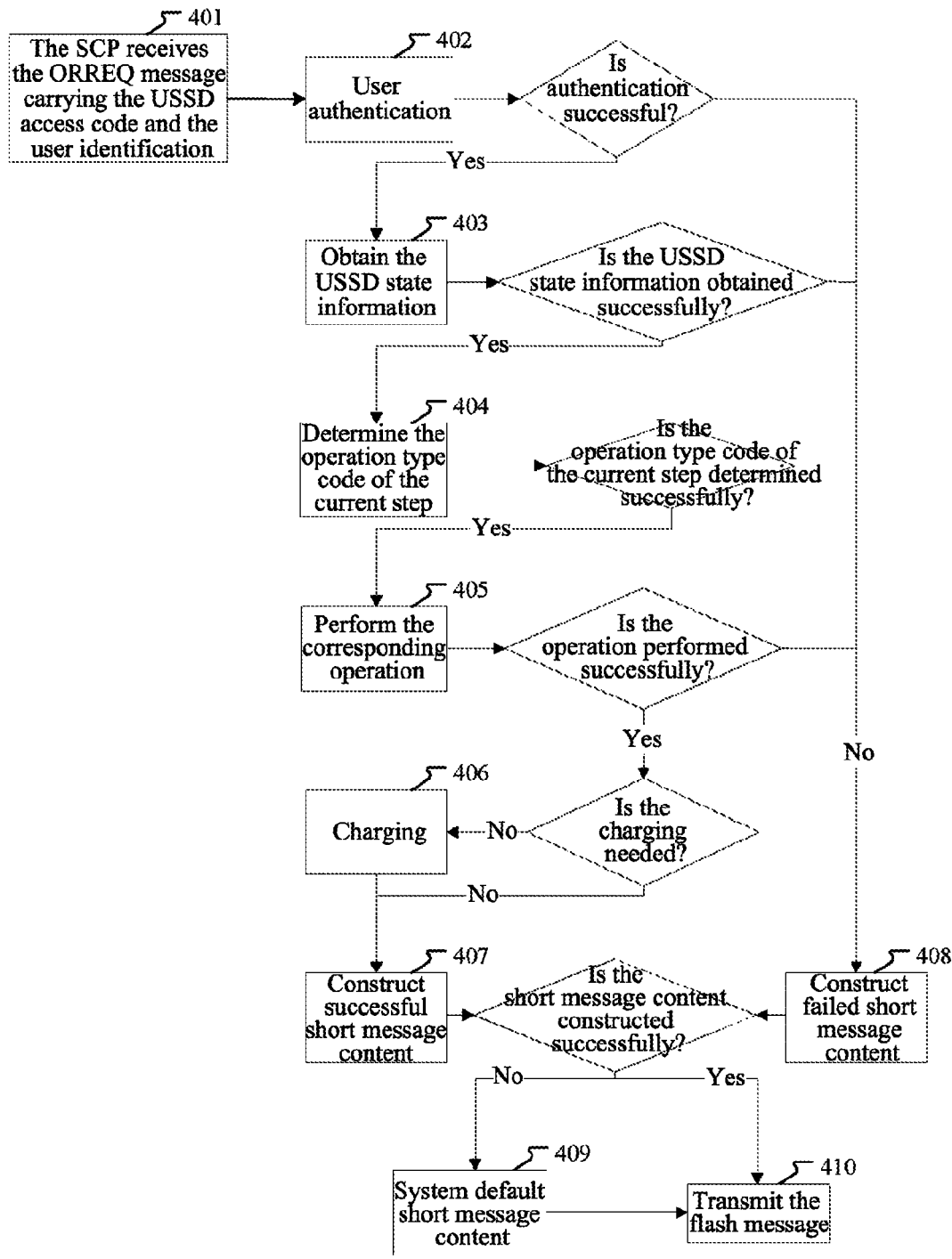
FIG. 4 is a flow chart of a specific implementation of a service example according to an embodiment of the present invention.

In the following, taking one service example in the service management function tree shown in FIG. 2 for example, the flow of the specific implementation of the service example will be illustrated. FIG. 4 is a flow chart of a specific implementation of a service example in an embodiment of the present invention. As shown in FIG. 4, the flow of the specific implementation of the service example in the embodiment of the present invention comprises the following steps.

In step 401, the SCP receives an ORREQ message carrying a USSD access code and a user identification.

In step 402, the SCP determines that which is requested by the user is the USSD service according to the USSD access code, starts up the USSD service operation process, and performs a user authentication on the MS according to the user identification.

In the specific implementation, the management function for the account comprises performing the authentication on the accounting account, expire date, account status, whether reporting the loss, whether being a blacklist, and if the authentication is successful, turn to step 403; otherwise, turn to step 408.

In step 403, the USSD state information of the MS is obtained.

The USSD state information refers to an executing state of the USSD function, the user identifications of various MSs, the operation type code of the previous step and the operating parameters of various preceding steps are recorded through the user state information table, the operating parameters are added into the same recording of the user state information table and are used in the last service example of the USSD function, and if the USSD state information is successfully obtained, turn to step 404; otherwise, turn to step 408.

In step 404, the operation type code of the current step is determined.

The operational processes of various USSD functions in the USSD service are constructed as a tree type structure, and the service management function tree can be defined and configured through the USSD service operation index table. When the service example is performed to the current step, the operation type code of the current step can be determined and an operation needed to be performed by the present service example is decided according to the obtained USSD state information and the USSD access code. If the operation type code of the current step is determined successfully, turn to step 405; otherwise, turn to step 408.

In step 405, the corresponding operation is performed according to the operation type code of the current step.

According to the operation type code of the current step, i.e., the type of the current service example, if the operation step to which the operation type code of the current step is the function complete operation, that is, the current service example is a specific USSD function (for example, recharge), then an existing functional module is directly invoked to perform the corresponding USSD function operation, and one record to which the MS corresponds in the user state information table is deleted, and the flow ends; and if the operation step to which the operation type code of the current step corresponds is not the function complete operation, that is, the current service example is a hierarchical menu or an intermediate operation, one record to which the MS corresponds in the user state information table is updated, and the operation type code of the previous step is updated as the determined operation type code of the current step, and if the ORREQ message further carries the operating parameter of the current step, then the operating parameter of the current step is added into that record. If the operation is performed successfully, turn to step 406; otherwise, turn to step 408.

In step 406, recharge is performed.

If the current service example is a free operation or there is no need to perform the recharge by the SCP, the step is directly skipped. In the specific implementation, if it is needed to define the recharge of the USSD function, the recharge step can be performed in the service example belonging to a leaf node in FIG. 2 (function complete operation), and whether the operation step to which the current operation type corresponds is a function complete operation can be configured in the USSD service operation index table.

In steps 407 to 408, the short message content is constructed and transmitted.

The short message content is configurable, but must be associated with the operation type code of the current step. A next-level menu is transferred through the short message content and the executing result of the operation of the current step is notified. The SCP needs to set a particular identification to be transmitted to the SMSC through a short message interface machine. If the short message content is constructed successfully, turn to step 410; otherwise, turn to step 409.

In step 409, the system default short message content is extracted.

In step 410, the SMSC selects to transmit the short message content by way of the flash message according to the pre-appointed particular identification, and the flow ends.

Figure 5:
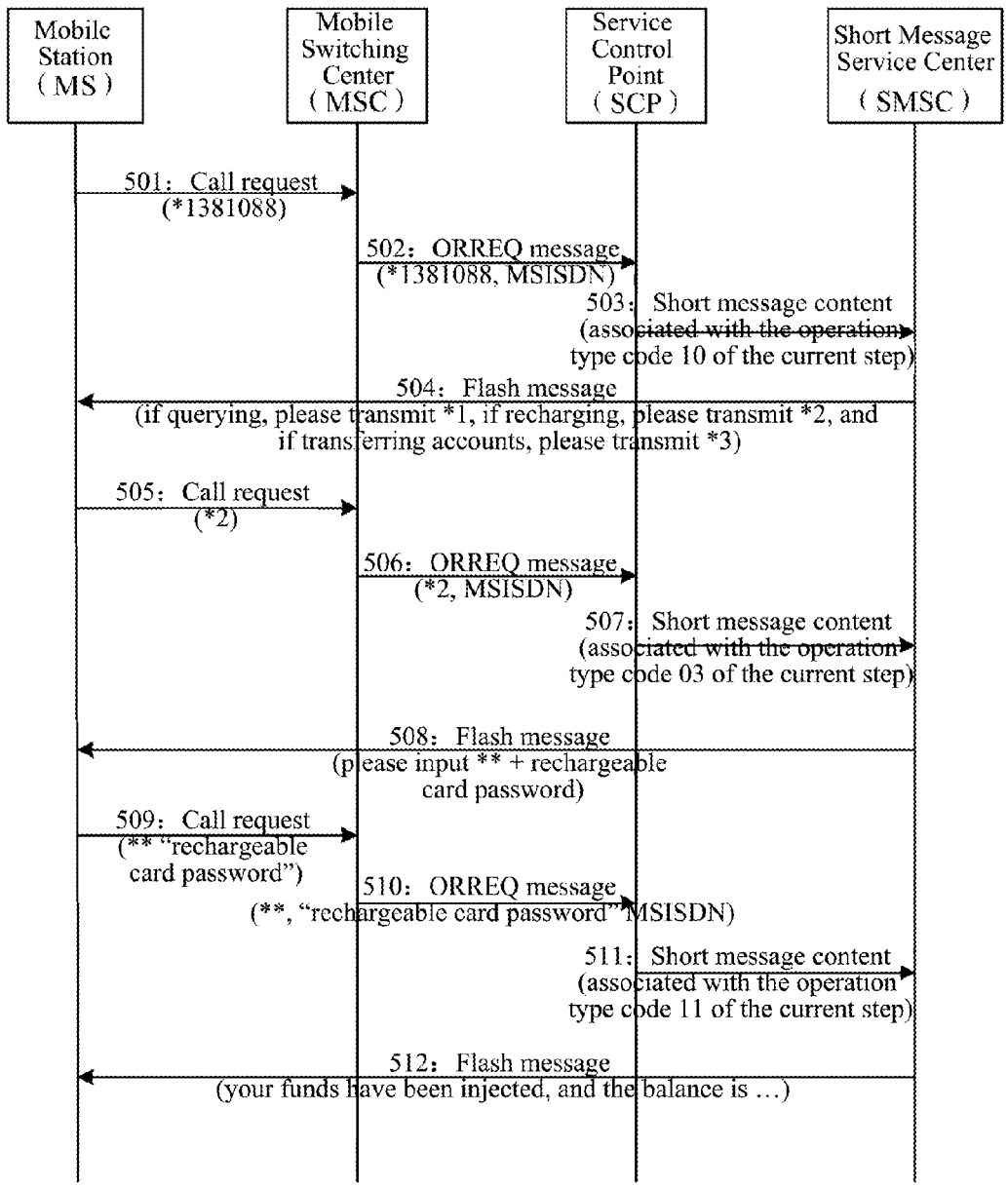
FIG. 5 is a flow chart of a specific operation of a USSD function according to an embodiment of the present invention.

In the following, the specific operation process of the USSD function is illustrated still by taking one USSD function in the service management function tree illustrated in FIG. 2 for example, and specifically, is illustrated by taking an account recharge function for example. It can be seen from FIG. 2 that, the specific operation process of the account recharge function are linearly composed of three service examples, and the operation type codes are 01, 03 and 11 respectively. FIG. 5 is a flow chart of a specific operation process of a USSD function according to an embodiment of the invention. As shown in FIG. 5, the specific operation process of the USSD function according to an embodiment of the invention comprises the following steps.

In step 501, a user enters *1381088 through a keypad, and presses a transmitting key, and the MS transmits a call request carrying a service access code (*1381088).

In step 502, the MSC receives the call request transmitted by the MS, transmits an ORREQ message carrying the Mobile Station International ISDN Number (MSISDN) and a service access code *1381088 to the SCP according to the queried mobile intelligent subscription information of the MS, wherein, the user identification generally uses the MSISDN, and of course can use the IMSI or other unique identifications.

In step 503, the SCP starts up a USSD service operation process according to the service access code *1381088, determines that the operation type code of the current step is 01 according to the MSISDN and the service access code *1381088, performs the corresponding operation according to the operation type code 01 of the current step, constructs the associated short message content "if querying, please transmit *1, if recharging, please transmit *2, and if transferring accounts, please transmit *3" and transmits it to the SMSC, and meanwhile transmits a pre-appointed short message type identification which indicates using the way of a flash message.

In step 504, the SMSC transmits the short message content "if querying, please transmit *1, if recharging, please transmit *2, and if transferring accounts, please transmit *3" to the MS by way of the flash message.

In step 505, the user enters *2 through the keypad and press the transmitting key according to a prompt of the received flash message, and the MS transmits a call request carrying an operation access code (*2).

In step 506, the MSC receives the call request transmitted by the MS, and transmits an ORREQ message carrying the MSISDN and the operation access code *2 to the SCP according to the queried mobile intelligent subscription information of the MS.

In step 507, the SCP starts up a USSD service operation process according to the operation access code *2, determines that the operation type code of the current step is 03 according to the MSISDN and the operation access code *2, performs the corresponding operation according to the operation type code 03 of the current step, constructs the associated short message content "please enter **+ rechargeable card password" and transmits it to the SMSC, and meanwhile transmits a pre-appointed short message type identification which indicates using the way of a flash message.

In step 508, the SMSC transmits the short message content "please enter ** rechargeable card password" to the MS by way of the flash message.

In step 509, the user enters  and rechargeable card password through the keypad and press the transmitting key according to a prompt of the received flash message, and the MS transmits a call request carrying an operation access code and the operating parameter of the current step ( "rechargeable card password").

In step 510, the MSC receives the call request transmitted by the MS, and transmits an ORREQ message carrying the MSISDN, the operating parameter of the current step "rechargable card password" and the operation access code ** to the SCP according to the queried mobile intelligent subscription information of the MS.

In step 511, the SCP starts up a USSD service operation process according to the operation access code , determines that the operation type code of the current step is 11 according to the MSISDN and the operation access code , performs the corresponding operation according to the operation type code 11 of the current step, performs recharge on the user's account according to the rechargeable card password, and if the recharge is successful, constructs the associated short message content "your funds are injected, and the balance is . . . " and transmits it to the SMSC, and meanwhile transmits a pre-appointed short message type identification which indicates using the way of a flash message.

In step 512, the SMSC transmits the short message content "your funds are injected, and the balance is . . . " to the MS by way of the flash message, and at the time, the account recharge function is completed.

Figure 6:
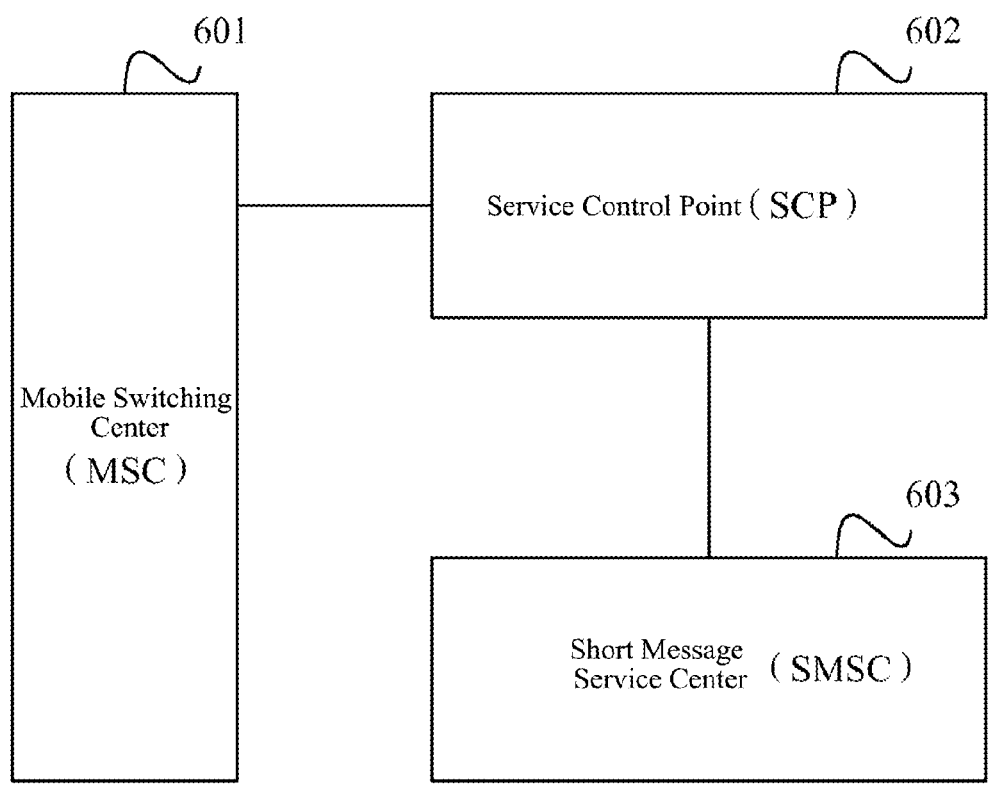
FIG. 6 is a block diagram of a system for implementing a USSD service in a CDMA network according to an embodiment of the present invention.

Based on the same technical concept, an embodiment of the present invention provides a system for implementing a USSD service in a CDMA network. FIG. 6 is a block diagram of a system for implementing a USSD service in a CDMA network according to an embodiment of the present invention. As shown in FIG. 6, the system for implementing the USSD service in the CDMA network according to the embodiment of the present invention comprises: a Mobile Switching Center (MSC) 601, a Service Control Point (SCP) 602 and a Short Message Service Center (SMSC) 603; wherein, the MSC 601 is configured to transmit an ORREQ message carrying a user identification and the USSD access code to the SCP according to a queried mobile intelligent subscription information of the MS when receiving a call request carrying a USSD access code transmitted by the MS;

the SCP 602 is configured to start up a USSD service operation process according to the USSD access code carried in the received ORREQ message, determine an operation type code of a current step according to the user identification and the USSD access code, and perform a corresponding operation according to the operation type code of the current step; and construct short message content associated with the operation type code of the current step, and transmit the constructed short message content and a short message type identification to the SMSC 603;

the SMSC 603 is configured to transmit the short message content to the MS by way of a flash message indicated by the short message type identification.

Figure 7:
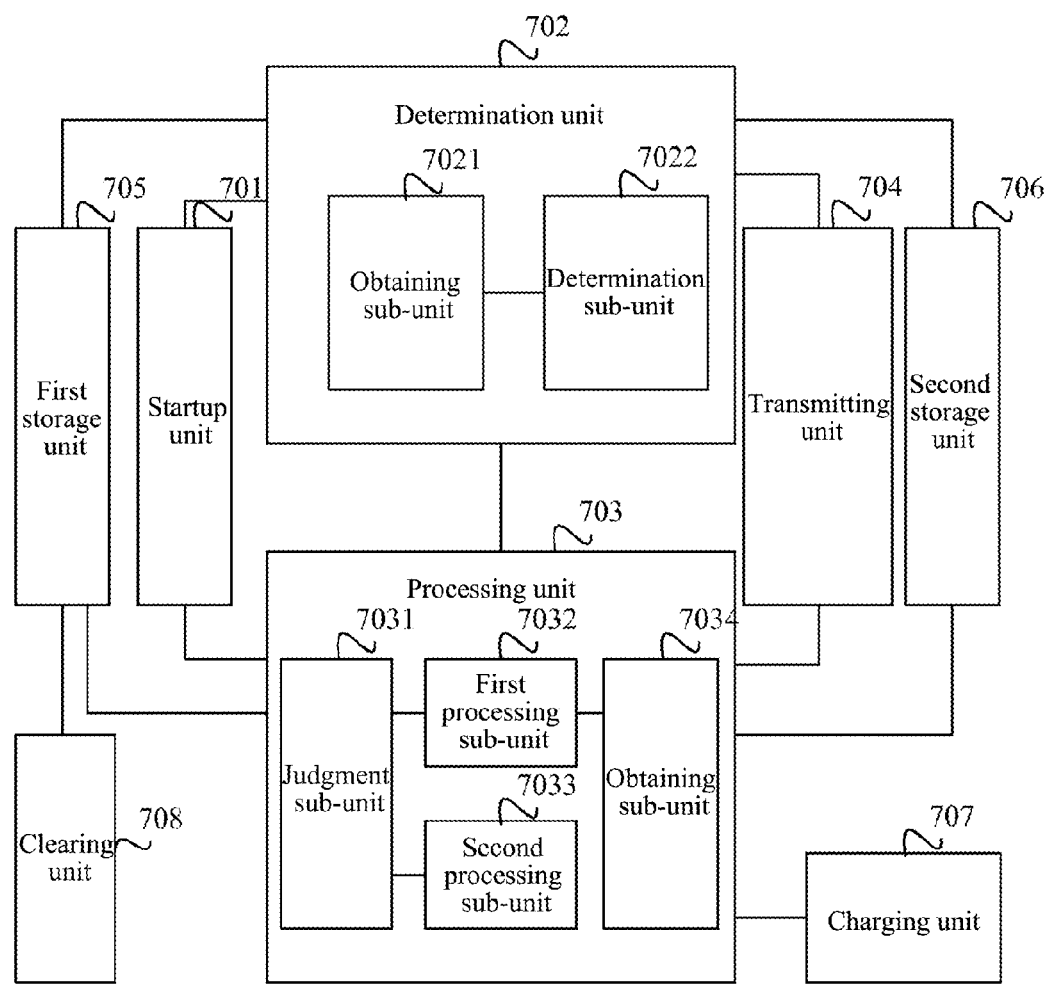
FIG. 7 is a block diagram of a structure of a SCP device according to an embodiment of the present invention.

Meanwhile, an embodiment of the present invention provides a structure of a SCP device. FIG. 7 is a block diagram of a SCP device according to an embodiment of the present invention. As shown in FIG. 7, the SCP device in the embodiment of the present invention comprises:

a startup unit 701, configured to receive an ORREQ message carrying a user identification and a USSD access code transmitted by a MSC, and start up a USSD service operation process according to the USSD access code carried in the received ORREQ message;

a determination unit 702, configured to determine an operation type code of a current step according to the user identification and the USSD access code;

a processing unit 703, configured to perform a corresponding operation according to the operation type code of the current step;

a transmitting unit 704, configured to construct short message content associated with the operation type code of the current step, transmit the constructed short message content and a short message type identification to the SMSC, wherein, the short message type identification indicates transmitting the short message content by way of a flash message.

Preferably, the device further comprises a first storage unit 705 and a second storage unit 706; wherein, the first storage unit 705 is configured to store a user state information table which records user identifications of various serving MSs and corresponding USSD state information, wherein the USSD state information at least comprises an operation type code of a previous step;

the second storage unit 706 is configured to store a preset USSD service operation index table which configures the USSD access code and the operation type code of the previous step to which each operation type code corresponds;

the determination unit 702 further comprises:

an obtaining sub-unit 7021, configured to query the user state information table in the first storage unit 705 according to the user identification, and obtain the USSD state information of the MS;

a determination sub-unit 7022, configured to query the USSD service operation index table in the second storage unit 706 according to the obtained operation type code of the previous step and the USSD access code, and determine the operation type code of the current step.

Preferably, the USSD service operation index table in the second storage unit 706 further configures a first indication information to which each operation type code corresponds, and the first indication information is configured to indicate whether an operation step to which the operation type code corresponds is a function complete operation.

The processing unit 703 further comprises:

a judgment sub-unit 7031, configured to judge whether the current step is a function complete operation according to the first indication information to which the operation type code of the current step corresponds, if the judgment result is that the current step is the function complete operation, trigger a first processing sub-unit 7032, and if the judgment result is that the current step is not the function complete operation, trigger a second processing sub-unit 7033;

the first processing sub-unit 7032, configured to perform a corresponding USSD function operation and delete the user identification and the corresponding USSD state information from the user state information table;

the second processing sub-unit 7033, configured to update the USSD state information to which the user identification corresponds in the user state information table.

Preferably, the USSD state information further comprises operating parameters of various preceding steps, and the first processing sub-unit 7032 is further configured to use the operating parameters of the various preceding steps in the USSD state information when performing the corresponding USSD function operation.

Preferably, the USSD service operation index table in the second storage unit 706 further configures a second indication information to which each operation type code corresponds, and the second indication information is configured to indicate whether the various preceding steps receive the operating parameters; and the processing unit 703 further comprises:

an extracting sub-unit 7034, configured to extract the operating parameters of various preceding steps from the USSD state information to which the user identification corresponds when determining that the various preceding steps receive the operating parameters according to the second indication information to which the operation type code of the current step corresponds.

Preferably, the ORREQ message further carries the operating parameter of the current step; and the first processing sub-unit 7032 is configured to use the operating parameter of the current step carried in the ORREQ message when performing the corresponding USSD function operation;

the second processing sub-unit 7033 is configured to, when updating the USSD state information to which the user identification corresponds in the user state information table stored in the first storage unit 705, update the operation type code of the previous step in the USSD state information as the determined operation type code of the current step, and add in the USSD state information the operating parameter of the current step carried in the ORREQ message.

Preferably, the device further comprises a charging unit 707, wherein, the second processing sub-unit 7033 is further configured to trigger the charging unit 707 after performing a corresponding USSD function operation;

the charging unit 707 is configured to charge the completed USSD function under the trigger of the second processing sub-unit 7033.

Preferably, the USSD state information further comprises operation time of the previous step, and the device further comprises:

the clearing unit 708, configured to, when a preset state information clear time arrives, delete the USSD state information in which a time interval between the operation time of the previous step and the state information clear time is larger than a set time interval threshold, and the corresponding user identification from the user state information table in the first storage unit 705.

The present invention can implement the USSD functions similar to those of the GSM network by using the existing intelligent network without adding any hardware resource under the CDMA network. Compared with the USSD service Like short number function of a pail of C network services, the present invention has the following advantages: implementing managing and configuring all management processes uniformly under one menu in terms of function; having good user operability, being able to provide a user-friendly operational prompt through the flash message, the distributed parameter input mode effectively reducing the user's misoperation, and also preventing a hidden trouble of intercepting the access code parameters by limitation of the number digits of the switch board causing by too many access code parameters; and on the aspect of service implementation, each service example node being able to be modularized, and having good portability.

The scheme provided by the embodiments of the present invention implements managing and configuring management processes of all the USSD functions uniformly under one menu in terms of function; has good user operability, is able to provide a user-friendly operation prompt by way of the flash message, effectively reduces the user's misoperation by the distributed operating parameter input mode, and effectively prevents a hidden trouble of limiting and intercepting the operation access code by MSC causing by too many digits of the operation access code; and on the aspect of USSD service implementation, each service example can be modularized, and has good portability and reusability.

Obviously, those skilled in the art can make various modifications and variations on the present invention without departing from the spirit and scope of the present invention. Thus, if these modifications and variations of the present invention belong to the scope of the claims of the present invention and the equivalent technologies thereof, the invention is also intended to include these modifications and variations.

What is claimed is:

1. A method for implementing an Unstructured Supplementary Service Data, USSD, service in a Code Division Multiple Access, CDMA, network, comprising:

a Mobile Switching Center, MSC, transmitting an origination request, ORREQ, message carrying a user identification and a USSD access code to a Service Control Point, SCP, according to a queried mobile intelligent subscription information of a Mobile Station, MS, when receiving a call request carrying the USSD access code transmitted by the MS;

the SCP starting up a USSD service operation process according to the USSD access code carried in the received ORREQ message, determining an operation type code of a current step according to the user identification and the USSD access code, and performing a corresponding operation according to the operation type code of the current step;

the SCP constructing short message content associated with the operation type code of the current step, and transmitting the constructed short message content and a short message type identification to a Short Message Service Center, SMSC; and the SMSC transmitting the short message content to the MS by way of a flash message indicated by the short message type identification.

2. The method according to claim 1, wherein, the determining the operation type code of the current step according to the user identification and the USSD access code comprises:

querying a user state information table which records user identifications of various severing MSs and corresponding USSD state information, and obtaining the USSD state information of the MS, wherein, the USSD state information at least comprises an operation type code of a previous step; and querying a preset USSD service operation index table according to the obtained operation type code of the previous step and the USSD access code, and determining the operation type code of the current step, wherein, the USSD service operation index table configures the USSD access code and the operation type code of the previous step to which each operation type code corresponds.

3. The method according to claim 2, wherein, the USSD service operation index table further configures a first indication information to which each operation type code corresponds, and the first indication information is configured to indicate whether an operation step to which the operation type code corresponds is a function complete operation; and the performing the corresponding operation according to the operation type code of the current step comprises: the SCP judging whether the current step is a function complete operation according to the first indication information to which the operation type code of the current step corresponds, and if the current step is the function completion operation, the SCP performing a corresponding USSD function operation and deleting the user identification and the corresponding USSD state information from the user state information table; and if the current step is not the function completion operation, the SCP updating the USSD state information to which the user identification corresponds in the user state information table.

4. The method according to claim 3, wherein, the USSD state information further comprises operating parameters of various preceding steps, and the SCP uses the operating parameters of the various preceding steps in the USSD state information when determining that the current step is the function complete operation and performing the corresponding USSD function operation.

5. The method according to claim 4, wherein, the USSD service operation index table further configures a second indication information to which each operation type code corresponds, and the second indication information is configured to indicate whether the various preceding steps receive the operating parameters, and before the performing the corresponding USSD function operation, the method further comprises: extracting the operating parameters of the various preceding steps from the USSD state information to which the user identification corresponds when determining that the various preceding steps receive the operating parameters according to the second indication information to which the operation type code of the current step corresponds.

6. The method according to claim 3, wherein, the call request transmitted by the MS further carries the operating parameter of the current step which is input by a user according to an indication of the flash message returned by the SMSC in the previous step, and the ORREQ message transmitted by the MSC further carries the operating parameter of the current step, the SCP uses the operating parameter of the current step carried in the ORREQ message when determining that the current step is the function complete operation and performing the corresponding USSD function operation; and the SCP, when determining that the current step is not the function complete operation and updating the USSD state information to which the user identification corresponds in the user state information table, updates the operation type code of the previous step in the USSD state information as the determined operation type code of the current step, and adds in the USSD state information the operating parameter of the current step carried in the ORREQ message.

7. The method according to claim 6, wherein, before using the operating parameter of the current step carried in the ORREQ message or adding in the USSD state information the operating parameter of the current step carried in the ORREQ message, the method further comprises: performing a legality validation on the operating parameter of the current step carried in the ORREQ message and confirming that the validation passes.

8. The method according to claim 1, further comprising:
after determining that the current step is a function complete operation and performing a corresponding USSD function operation, the SCP charging the completed USSD function.

9. The method according to claim 2, wherein, the USSD state information further comprises operation time of the previous step, and the method further comprises:
when a preset state information clear time arrives, deleting the USSD state information in which a time interval between the operation time of the previous step and the state information clear time is larger than a set time interval threshold, and the corresponding user identification from the user state information table,
or, the USSD access code comprises a service access code and an operation access code, and the method further comprises:
when the USSD access code carried in the ORREQ message is the service access code and judging whether the user state information table comprises the USSD state information to which the user identification corresponds before querying the user state information table according to the user identification, and when a judgment result is that the user state information table comprises the USSD state information, deleting the USSD state information to which the user identification corresponds.

10. The method according to claim 2, wherein, the USSD service operation index table further configures a short message content code to which each operation type code corresponds, and
the SCP constructing the short message content associated with the operation type code of the current step comprises:
determining the short message content code to which the operation type code of the current step corresponds according to the USSD service operation index table; and
constructing the short message content according to the determined short message content code and a preset short message content configuration table, wherein, the short message content configuration table configures the short message content configuration information to which each short message content code corresponds.

11. The method according to claim 1, wherein, before the determining the operation type code of the current step according to the user identification and the USSD access code, the method further comprises: the SCP performing a user authentication on the MS according to the user identification and confirming that the authentication passes.

12. A system for implementing an Unstructured Supplementary Service Data, USSD, service in a Code Division Multiple Access, CDMA, network, comprising: a Mobile Switching Center, MSC, a Service Control Point, SCP, and a Short Message Service Center, SMSC; wherein,
the MSC is configured to transmit an origination request, ORREQ, message carrying a user identification and a USSD access code to the SCP according to a queried mobile intelligent subscription information of a Mobile Station, MS, when receiving a call request carrying the USSD access code transmitted by the MS;

the SCP is configured to start up a USSD service operation process according to the USSD access code carried in the received ORREQ message, determine an operation type code of a current step according to the user identification and the USSD access code, and perform a corresponding operation according to the operation type code of the current step; and construct short message content associated with the operation type code of the current step, and transmit the constructed short message content and a short message type identification to the SMSC; and the SMSC is configured to transmit the short message content to the MS by way of a flash message indicated by the short message type identification.

13. A device for implementing an Unstructured Supplementary Service Data, USSD, service in a Code Division Multiple Access, CDMA, network, comprising: a startup unit, a determination unit, a processing unit and a transmitting unit; wherein, the startup unit is configured to receive an origination request, ORREQ, message carrying a user identification and a USSD access code transmitted by a Mobile Switching Center, MSC, and start up a USSD service operation process according to the USSD access code carried in the received ORREQ message;

the determination unit is configured to determine an operation type code of a current step according to the user identification and the USSD access code;

the processing unit is configured to perform a corresponding operation according to the operation type code of the current step; and the transmitting unit is configured to construct short message content associated with the operation type code of the current step, transmit the constructed short message content and a short message type identification to the SMSC, wherein the short message type identification indicates transmitting the short message content by way of a flash message.

14. The device according to claim 13, further comprising a first storage unit and a second storage unit; wherein, the first storage unit is configured to store a user state information table which records user identifications of various serving MSs and corresponding USSD state information, wherein the USSD state information at least comprises an operation type code of a previous step;

the second storage unit is configured to store a preset USSD service operation index table which configures the USSD access code and the operation type code of the previous step to which each operation type code corresponds;

the determination unit further comprises an obtaining sub-unit and a determination sub-unit, wherein, the obtaining sub-unit is configured to query the user state information table in the first storage unit according to the user identification, and obtain the USSD state information of the MS; and the determination sub-unit is configured to query the USSD service operation index table in the second storage unit according to the obtained operation type code of the previous step and the USSD access code, and determine the operation type code of the current step.

15. The device according to claim 14, wherein,
the USSD service operation index table in the second storage unit further configures a first indication information to which each operation type code corresponds, and the first indication information is configured to indicate whether an operation step to which the operation type code corresponds is a function complete operation; and the processing unit further comprises a judgment sub-unit, a first processing sub-unit and a second processing sub-unit; wherein, the judgment sub-unit is configured to judge whether the current step is a function complete operation according to the first indication information to which the operation type code of the current step corresponds, if the judgment result is that the current step is the function complete operation, trigger the first processing sub-unit, and if the judgment result is that the current step is not the function complete operation, trigger the second processing sub-unit;

the first processing sub-unit is configured to perform a corresponding USSD function operation and delete the user identification and the corresponding USSD state information from the user state information table; and the second processing sub-unit is configured to update the USSD state information to which the user identification corresponds in the user state information table.

16. The device according to claim 15, wherein, the USSD state information further comprises operating parameters of various preceding steps, and the first processing sub-unit is further configured to use the operating parameters of the various preceding steps in the USSD state information when performing the corresponding USSD function operation.

17. The device according to claim 16, wherein, the USSD service operation index table in the second storage unit further configures a second indication information to which each operation type code corresponds, and the second indication information is configured to indicate whether the various preceding steps receive the operating parameters; and the processing unit further comprises an extracting sub-unit, which is configured to extract the operating parameters of the various preceding steps from the USSD state information to which the user identification corresponds when determining that the various preceding steps receive the operating parameters according to the second indication information to which the operation type code of the current step corresponds.

18. The device according to claim 15, wherein, the ORREQ message further carries the operating parameter of the current step;

the first processing sub-unit is further configured to use the operating parameter of the current step carried in the ORREQ message when performing the corresponding USSD function operation; and the second processing sub-unit is further configured to, when updating the USSD state information to which the user identification corresponds in the user state information table, update the operation type code of the previous step in the USSD state information as the determined operation type code of the current step, and add in the USSD state information the operating parameter of the current step carried in the ORREQ message.

19. The device according to claim 13, further comprises a charging unit, wherein, the second processing sub-unit is further configured to trigger the charging unit after performing a corresponding USSD function operation; and the charging unit is configured to charge the completed USSD function under the trigger of the second processing sub-unit.

20. The device according to claim 14, wherein, the USSD state information further comprises operation time of the previous step, and the device further comprises a clearing unit, wherein, the clearing unit is configured to, when a preset state information clear time arrives, delete the USSD state information in which a time interval between the operation time of the previous step and the state information clear time is larger than a set time interval threshold, and the corresponding user identification from the user state information table in the first storage unit.

* * * * *